Figure 1:
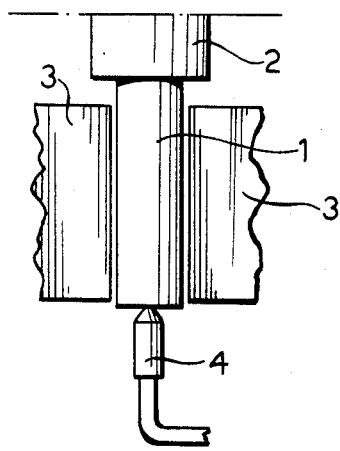

United States Patent [19]
Crupi

[11] Patent Number: 4,747,768
[45] Date of Patent: May 31, 1988

[54] APPARATUS FOR MANUFACTURING SHAPED ARTICLES OF PLASTICS MATERIAL, PARTICULARLY FILLING PIPES FOR FUEL TANKS OF MOTOR VEHICLES

[75] Inventor: Giuseppe Crupi, Rosta, Italy

[73] Assignee: 501 C-Plast di Crupi D. & C. S.N.C., Turin, Italy

[21] Appl. No.: 932,188

[22] Filed: Nov. 17, 1986

[30] Foreign Application Priority Data

Nov. 22, 1985 [IT] Italy .................... 67986 A/85

[51] Int. Cl.$^4$ ............................................. B29C 53/08
[52] U.S. Cl. ........................................ 425/392; 72/369; 72/381; 425/394
[58] Field of Search ............... 425/392, 393, 522, 535, 425/536, 394; 264/339; 72/380, 381, 369

[56] References Cited

U.S. PATENT DOCUMENTS

| | | | |
|---|---|---|---|
| 220,536 | 10/1879 | Hyde | 264/339 |
| 2,044,322 | 6/1936 | Oliver et al. | 72/369 |
| 2,485,282 | 10/1949 | Green | 72/380 |
| 2,831,382 | 4/1958 | Klamm | 72/380 |
| 3,650,140 | 3/1972 | Zmuda | 72/369 |
| 3,753,635 | 8/1973 | Barnett | 264/339 |
| 3,884,612 | 5/1975 | Parmann | 425/392 |
| 4,009,982 | 3/1977 | Maier | 425/392 |
| 4,160,006 | 7/1979 | Patzner et al. | 264/339 |
| 4,352,281 | 10/1982 | Ragettli | 72/369 |

FOREIGN PATENT DOCUMENTS

| | | | |
|---|---|---|---|
| 0005201 | 9/1945 | Australia | 72/381 |
| 4920870 | 5/1974 | Japan | 72/381 |
| 0077021 | 6/1981 | Japan | 72/381 |
| 0007568 | of 1884 | United Kingdom | 72/381 |
| 567743 | 3/1945 | United Kingdom | 72/381 |
| 2094681 | 9/1982 | United Kingdom | 72/381 |

*Primary Examiner*—Willard Hoag
*Attorney, Agent, or Firm*—D. Peter Hochberg; Mark M. Kusner; Walter C. Danison, Jr.

[57] ABSTRACT

In order to manufacture shaped tubular articles of plastics material, a semi-finished tube of softened plastics which is substantially straight and has a diameter about equal to the diameter of the article to be formed is introduced into a mould defining a cavity which is substantially straight. Subsequently, the mould is operated so as to deform the cavity and give it a shape corresponding to the shape of the article to be formed.

7 Claims, 3 Drawing Sheets

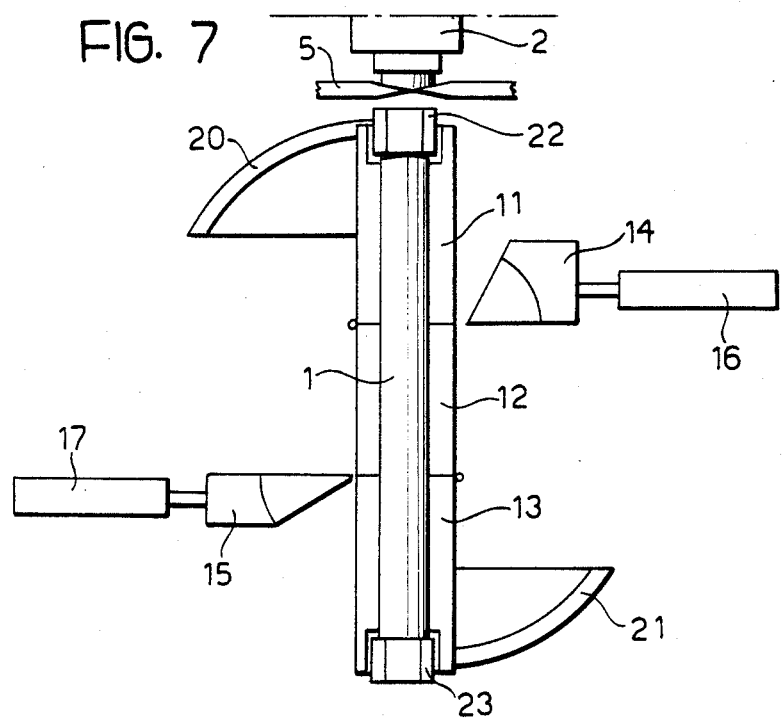
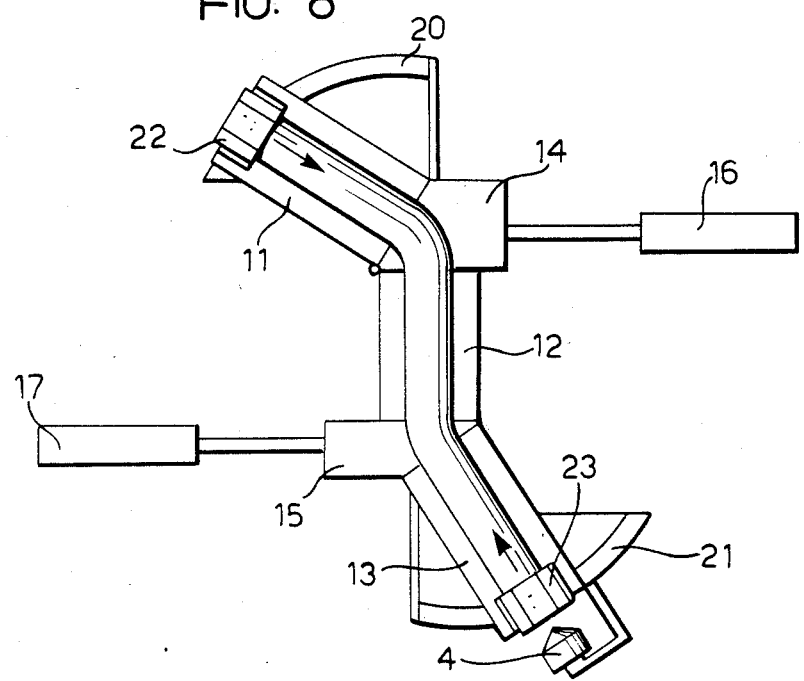

APPARATUS FOR MANUFACTURING SHAPED ARTICLES OF PLASTICS MATERIAL, PARTICULARLY FILLING PIPES FOR FUEL TANKS OF MOTOR VEHICLES

DESCRIPTION

The present invention relates to the manufacture of shaped articles of plastics material. The invention has been developed with particular attention to the problems inherent in the manufacture of tubular elements such as, for example, filling pipes for motor vehicle fuel tanks.

Such tubes, one made from metal, are now usually made from plastics material. They generally have one or more elbows or bends which give the tube an overall shape such as to comply with the—very strict—requirements on bulk within the motor vehicle.

According to one known solution, such tubes are made in the form of flexible tubes (corrugated tubes) of plastics material. This solution is unsatisfactory from at least two points of view.

In the first place, the requirement for making the tube flexible conflicts with the need to give the walls of the tube itself good resistance to impacts. At least a portion of the filling tube of a motor vehicle tank may in fact extend within one of the wings of the motor vehicle and thus be exposed to stones and other objects accidentally thrown up from the ground by the wheels.

Another disadvantage is due to the fact that the corrugations in the tube obstruct the flow of fuel to the tank. As well as facilitating the formation of fuel vapours in the tube, the corrugations, particularly those closest to the end at which the fuel is introduced, constitute rebound surfaces for the fuel. When this is introduced into the tube at a high rate of flow (for example, a flow rate of the order of 300 liters per minute) the fuel regurgitates and tends to flow out of the filling tube.

Figure 2:
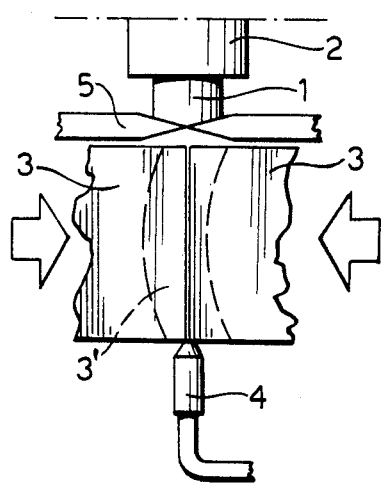
Figure 3:
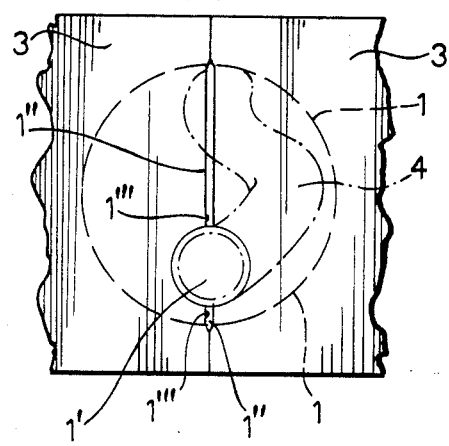

In another solution, to which FIGS. 1 to 3 refer, an extruded semi-finished tube 1 of thermo-softening plastics material (typically a resin of the Rilsan type, which can withstand the corrosive action of the fuel) leaves the die 2 of an extruder (not illustrated in its entirety) and descends between two half-moulds 3 which are reciprocable between an open position (FIG. 1) and a closed position (FIG. 2) and which, in the closed position, define a mould cavity 3' of a form corresponding to the external form of the article to be made.

The two half-moulds 3 are brought into a mating position to enclose the semi-finished tube 1 between them. The part of the semi-finished tube 1 located in the mould cavity 3' is kept open and expanded by the introduction of pressurised gas into the cavity 3'. For this purpose, the mould cavity 3' (typically at one of its ends) has an associated blowing nozzle 4 which in some cases extends a certain distance into the mould cavity 3'.

This solution is satisfactory only when approximately straight tubular article are formed.

Figure 4:
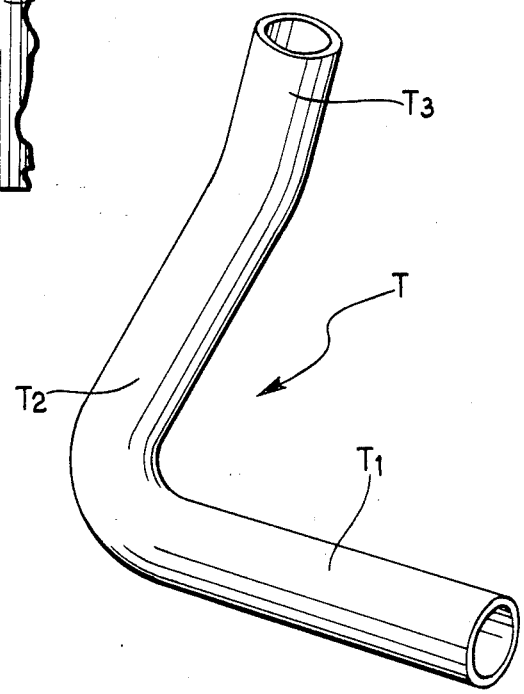

The solution is totally unsatisfactory, however, when shaped articles such as the filling tube T illustrated in FIG. 4 must be formed.

One is dealing essentially with a tube which can be seen to include:
 a first straight portion $T_1$,
 a second straight portion $T_2$ at an angle of the order 90°–95° to the first portion $T_1$, and
 a third, shorter straight portion $T_3$ at a generally obtuse angle to the straight portion $T_2$.

The angles between the portions $T_1$, $T_2$ and the portions $T_2$, $T_3$ respectively lie in two planes approximately perpendicular to each other.

In order to form the tube T by the blow-moulding method explained previously it is necessary to provide a semi-finished tube 1 defining a cylindrical volume such as to circumscribe completely the spatial path along which the tube T extends (FIG. 3).

The moulding operation then provides for only a small part of the semi-finished tube (indicated 1') intended to define the tube T remaining effectively open at the end of the moulding operation.

The remaining parts of the walls of the semi-finished tube 1 are, so to speak, squashed between the two half-moulds 3, as in the regions indicated 1" in FIG. 3, and will then be separated from the tube T and thrown away as waste.

This solution thus has very little benefit in practical terms.

In the first place, in order to form the semi-finished tube 1, it is necessary to use a much greater quantity of plastics material than that which will effectively constitute the tube T at the end of the blow-moulding operation.

By way of quantitative reference, the Applicants have found that, in some cases, it is necessary to form a semi-finished tube 1 with a weight of about 3–3.5 Kg in order to manufacture a tube having a final weight of about 350g in accordance with the prior art. In other words, almost 90% of the material constituting the semi-finished tube 1 will be waste.

In fact, the waste from the working may be recycled for use in subsequent operations. In general, however, the waste should not be reused more than once because the material resulting from subsequent cycles of reutilisation does not enable articles of an acceptable quality to be obtained.

Another disadvantage is due to the fact that the mass of plastics material which will be wasted has a high thermal inertia. This leads to delay in working due to the fact that, before the waste can be removed, it is necessary to wait until it has reached a temperature at which it can be handled. Furthermore, this means that the mass of waste could cause deformation of the walls of the tube T, resulting in moulding tolerances which may even be of several mm in articles having a length of the order of several tens of centimetres.

A further disadvantage is due to the fact that the wall of the tube formed by the prior art has two joins or welds along its entire length corresponding to the regions (indicated 1‴ in FIG. 3) in which the waste 1" is separated from the tube as a result of the closure of the two half-moulds 3. In closing against each other, the two half-moulds, as well as defining the cavity of the mould, bring two seam-cutting projections into mutual contact to separate the tube 1' from the waste 1", facilitating its detachment in a subsequent operation.

In some cases, the separation effected by the half-moulds may cause weakening of the tube with the possibility of the escape of the liquid conveyed in it: in such a case the tube must be thrown away.

The object of the present invention is to provide apparatus and a method for manufacturing shaped articles of plastics material, which do not give rise to the disadvantages expounded above.

According to the present invention, this object is achieved by means of apparatus for manufacturing shaped articles having at least one curve (elbow) from plastics material, in which a semi-finished tube ("parison") of softened plastics is enclosed between at least two complementary half-moulds together defining a mould cavity, characterised in that at least one of the half-moulds includes, in correspondence with the region of the mould cavity intended to define each curve of the article, mould part which is movable between a position of introduction of the semi-finished tube in which the mould cavity is substantially straight and a final forming position in which the mould cavity has a shape which reproduces, in a complementary manner, the form of the shaped article.

In other words, the apparatus according to the invention enables the carrying out of a method (which also forms the subject of the present invention) for the manufacture of shaped articles having at least one curve from plastics material, characterised in that it includes the steps of:

providing a forming mould which, in a first position of operation, defines a substantially straight cavity, forming a substantially straight semi-finished tube of plastics material, introducing the semi-finished tube into the mould cavity in the first position of operation, and deforming the mould to give the cavity a shape which reproduces, in a complementary manner, the shape of the article which is to be formed.

The advantages which can be obtained from the invention are essentially as follows:

it is possible to manufacture shaped tubular articles which extend along even very complex paths and have smooth walls, that is, without corrugations and without weld points (regions 1''' of FIG. 3), with a wall thickness which may be selected freely in dependence on the requirements of use, while ensuring the necessary resistance to impacts;

the shaped articles are manufactured from a semi-finished tube constituted by a mass of material which is practically identical to that which constitutes the finished shaped article: in other words the manufacture does not form appreciable waste with the harmful effects indicated above.

Figure 5:
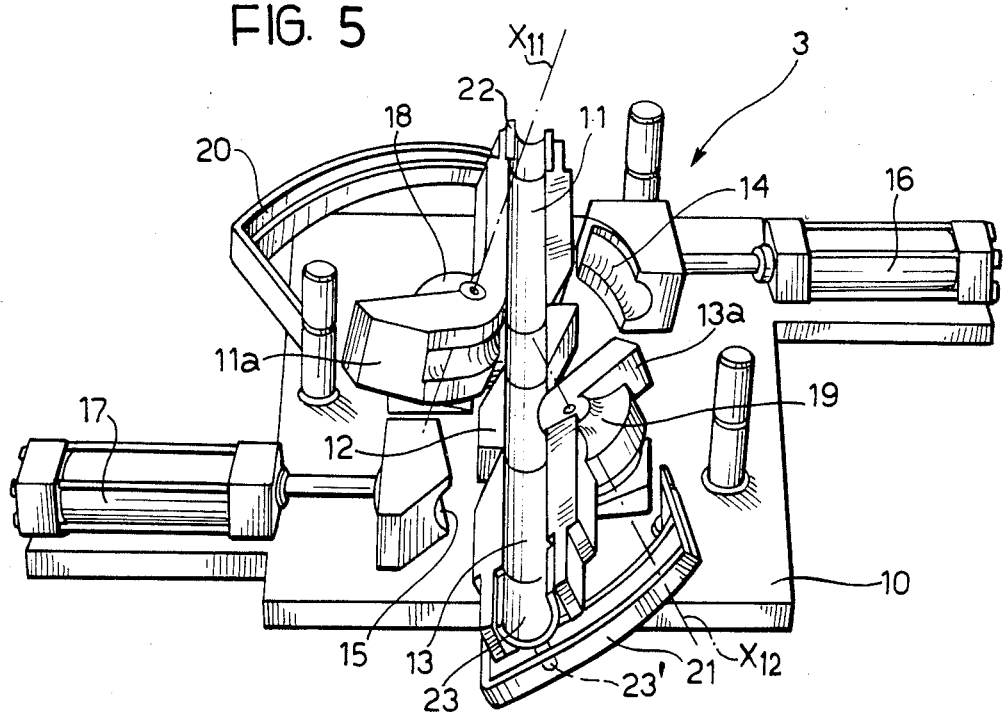
Figure 6:
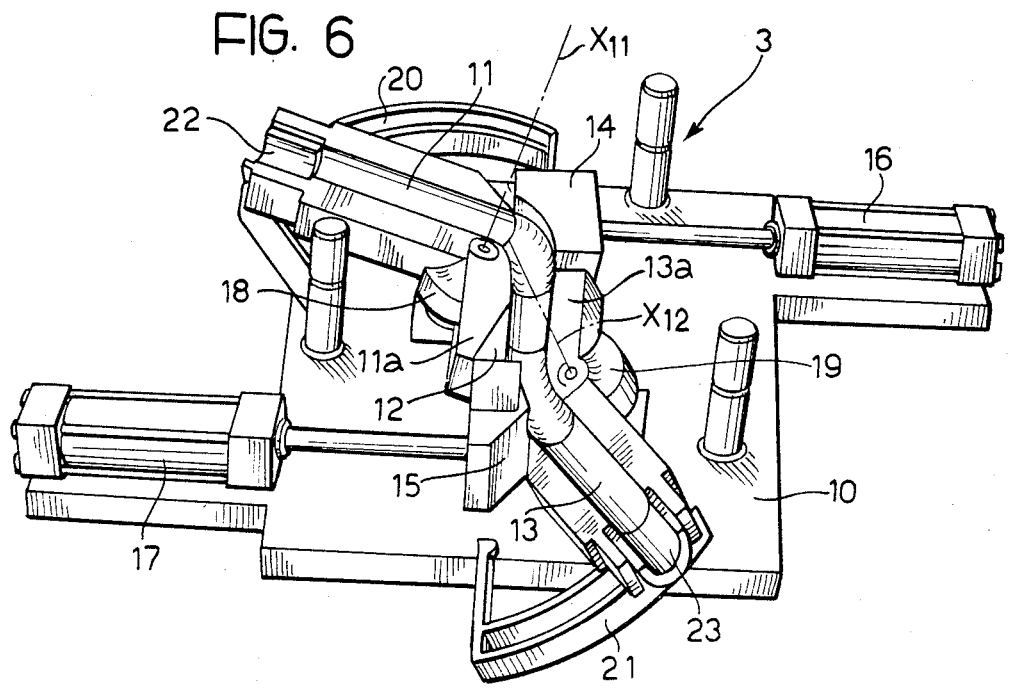

The invention will now be described, purely by way of non-limiting example, with reference to the appended drawings, in which:

FIGS. 1 to 4, to which reference has already been made, illustrate the general criteria by which a manufacturing method of the prior art is carried out (FIGS. 1 to 3) and a shaped tubular article of plastics material which can be manufactured by the invention (FIG. 4), FIGS. 5 and 6 illustrate one of the half-moulds used in apparatus according to the invention in two sucessive positions of operation, and FIGS. 7 and 8 are two further schematic illustrations substantially corresponding to FIGS. 5 and 6, illustrating the criteria by which the method of the invention is carried out in general terms.

In FIGS. 5 and 6, by way of analogy with FIGS. 1 to 3, one of the two half-moulds intended to be used in the manufacture of shaped articles of plastics material, such as the filling pipe of FIG. 4, is indicated 3.

In other words, the half-mould 3 of FIGS. 5 and 6 (and also its complementary half-mould not specifically illustrated in the appended drawings) comprises a base plate 10 which allows it to be installed in blow-moulding apparatus substantially the same as that already used in the prior art.

As seen previously, this apparatus includes an extruder provided at the bottom with a draw-plate 2 from which an extruded semi-finished tube 1 of thermo-softening plastics material is discharged, in accordance with a programmed extrusion cycle, for subjection to the action of the two half-moulds 3 located beneath the draw-plate 2.

A cutter unit, such as shears 5, interposed between the draw-plate 2 and the half-moulds 3, cuts the semi-finished tube 1 which leaves the draw-plate 2 substantially continuously, so as to separate semi-finished pieces for use in the manufacture of shaped articles.

We now pass to a detailed examination of the half-mould of FIGS. 5 and 6 for use in the manufacture of the tube T of FIG. 4, where it may be seen that three generally channel-shaped mould parts, indicated 11, 12 and 13 respectively, are mounted on the plate 10.

More particularly, the part 11 is intended to form, together with the homologous part of the complementary half-mould, the portion $T_1$ of the tube T. In an entirely similar manner, the mould parts 12 and 13, together with the homologous parts of the other half-mould, are intended respectively to form the portions $T_2$ and $T_3$ of the tube T.

The part 12 (and also the complementary part of the other half-mould) is mounted in a fixed position on the plate 10.

Each of the parts 11 and 13, however, can pivot about a respective rotation axis $X_{11}$, $X_{12}$ to move from a first position of operation, which is illustrated in FIG. 5, to a second position of operation, which is illustrated in FIG. 6.

In general, the rotation axes of the parts 11 and 13 are not parallel to each other. They are in fact perpendicular to the planes in which the angles formed by the portions $T_1$ and $T_2$ and $T_2$ and $T_3$ of the tube T lie. The choice of the relative inclinations of these planes, which depend on the shape of the article T to be formed, is substantially free.

In the first position of operation of FIG. 5, the mould parts 11, 12 and 13 (and, as always, the homologous parts of the complementary half-mould) are substantially aligned with each other.

One is thus dealing with a position in which the semi-finished tube 1 may easily be introduced into the mould cavity along the straight line defined by the parts 11, 12 and 13.

In the second position of operation, the movable parts 11 and 13 rotate relative to the fixed part 12 so as to become located along a path corresponding to the line of extension of the tube T to be formed. In other words, in the second operating position, the mould parts 11, 12 and 13 (and, as always, the homologous parts of the other half-mould) define a mould cavity which reproduces, in a complementary manner, the shape of the tube T.

In general, as a result of the rotation towards the final forming position shown in FIG. 6, the mould parts 11 and 13 leave part of the forming cavity, so to speak, "uncovered". In other words, as a result of the pivoting towards the final forming position, discontinuities are formed in the wall of the mould cavity.

Two auxiliary mould elements or blocks 14 and 15 mounted on slide parts slidable on the plate 10 under the action of respective hydraulic of pneumatic actuators 16, 17 can advance towards the mould parts 11, 12 and 13 so as to reconstitute the continuity of the wall of the mould cavity.

Each block 14 and 15 may be constituted by two complementary parts each slidable on one of the half-moulds 3. Alternatively, it is possible to provide blocks 14 and 15 each constituted by a single piece slidable on only one of the two half-moulds 3.

The same consideration applies to the actuators 16 and 17, which may be provided on only one of the half-moulds. The block parts on the other half-mould may in fact be connected (for example by pins) to the block parts mounted on the half-mould provided with the actuators, so as to ensure that they are moved without the need to provide independent drive means.

The same consideration may in fact apply to the movement of the pivoting parts 11 and 13.

In the embodiment illustrated, the parts 11 and 13 are fixed at one end to rotatable turrets 18 and 19 which rotate about the axes $X_{11}$ and $X_{12}$ under the action of a fluid motor, an electric motor or a gear transmission.

Again in this case, the drive means may be provided on only one of the two half-moulds, the transmission of movement to the movable parts of the complementary half-mould being ensured through pins or like drive members.

Naturally, the movement of the blocks 14 and 15 can also be driven with the use of motor means (electric, etc.) other than the actuators 16 and 17 illustrated here.

An appendage, indicated 11a, of the part 11 (a similar appendage is provided on the complementary part mounted on the other half-mould) forms an angle of about 90°–95° with the body of the part 11, equal to the angle between the portions $T_1$ and $T_2$ of the tube 4. In the position of introduction of the semi-finished tube (FIG. 5) the appendage 11a, which extends from that end of the part 11 facing the part 12, projects outwardly of the mould cavity. In the final forming position of FIG. 6, however, the appendage 11a is in a position in which it bears against the part 12 (which has a corresponding recess) so as to complete the wall of the mould cavity. Another appendage 13a with a structurally similar function is provided on the movable part 13.

Two arcuate structures 20 and 21 are fixed to the plate 10 in correspondence with the free ends of the parts 11 and 12 and function as operating cams for two pusher members 22 and 23 mounted in correspondence with the free ends of the parts 11 and 13 (that is, the ends opposite the turrets 18 and 19).

The function of the members 22 and 23, which in general have a cylindrical or sleeve structure, is to exert a thrust on the ends of the semi-finished tube 1 introduced into the half-moulds in order to facilitate the entry of the ends of the semi-finished tube 1 into the mould cavity when the movable parts 11 and 13 are brought into the final forming position shown in FIG. 6.

In fact, when the semi-finished tube 1 is introduced into the mould cavity defined by the parts 11, 12 and 13, the cavity has an overall axial length less than that which the cavity itself has in the final position of the mould in FIG. 6. For this purpose, it suffices to note that in the final position the mould cavity is, so to speak, "lengthened" in correspondence with the curves of the blocks 14 and 15.

This lengthening of the mould cavity could cause undesirable drawing of the semi-finished tube 1 which is shaped exactly in correspondence with the curved parts.

In order to avoid this drawing, which could cause squashing and/or weakening of the wall of the tube T in correspondence with the curves, the two ends of the semi-finished tube 1 are, so to speak, accompanied into the mould cavity by the pusher members 22 and 23.

Each of these members has a pin (only the pin 23′ associated with the pusher member 23 is visible in the drawings) which cooperates with the respective cam 20, 21 so that, as a result of the rotation of the part 11 from the position of receiving the semi-finished tube (FIG. 5) towards the final forming position (FIG. 6), the pusher member 22, 23 is thrust into the respective movable mould part 11,13.

Naturally, as far as the pusher members 22 and 23 provided on the two complementary half-moulds are concerned, the considerations given above for the other movable parts of the half-moulds also apply. The cam parts 20 and 22 may in fact be mounted on only one of the half-moulds, use then being made of either a single pusher member for each pair of homologous movable parts (11 or 13) or two complementary pusher members connected together by pins or other drive members.

The schematic representations of FIGS. 7 and 8 (corresponding respectively to FIGS. 5 and 6, with the use of the same reference numerals) summarise schematically the salient characteristics of the invention.

In order to form a shaped tubular article such as the tube T, a semi-finished tube 1 of thermo-softening plastics material is first formed with a diameter corresponding substantially to the diameter of the tube T. One is thus dealing with a semi-finished tube including a mass of plastics material which is practically the same as the mass intended to constitute the finished tube T.

The semi-finished tube 1 is introduced longitudinally into the two half-moulds 3 which are coupled together and in which the mould parts 11 and 23 are kept in a position of alignment with the central fixed part 12.

The semi-finished tube 1 is introduced into the mould cavity—which for the moment has a straight form—so that its ends project beyond the ends of the cavity itself, and the pusher members 22 and 23 are then brought into their positions of abutment against the ends of the semi-finished tube 1.

Immediately the semi-finished tube 1, which has been separated from the extrusion leaving the draw-plate 2 by the cutting unit 5, has been securely received within the mould, the drive means associated with the turrets 18 and 19 are actuated so as to bring the mould parts 11 and 13 into the final forming position of FIGS. 6 and 8.

Simultaneously, the actuators 16 and 17 are actuated so as to bring the blocks 14 and 15 against the mould parts 11, 12 and 13, thus reconstituting the continuity of the walls of the mould cavity.

As a result of the pivoting of the mould parts 11 and 13, the pusher members 22 and 23, which cooperate with the cam parts 20 and 21, move gradually (in synchronism with the pivoting of the parts 11 and 13) towards the interior of the mould cavity. Thus, a pushing force is exerted on the two opposite ends of the semi-finished tube 1 which, as seen previously, prevents the tube itself from being drawn in the regions of the curves.

In the final forming position, one of the movable parts 11 and 13 (the part 13 in the embodiment illustrated) moves into a position of alignment with the blowing nozzle 4 which can therefore blow pressurised gas into the semi-finished tube to ensure its correct shaping. Alternatively, the nozzle 4 may be carried by one of the movable parts so as to follow the pivoting movement of the part itself.

The forming of the tube T thus being completed, the two half-moulds 3 are again opened and the piece is removed.

The movable parts 11 and 13 are then returned to their initial positions, while blocks 14 and 15 are removed and the two half-moulds thus returned to their initial conditions for receiving a new semi-finished tube 1.

Naturally, the principle of the invention remaining the same, the constructional details and forms of embodiment may be varied widely with respect to that described and illustrated.

In particular, the number, configuration and arrangement of the movable parts and the blocks of the half-moulds could be changed according to the conformation of the article to be formed.

Similarly, various solutions, even dissimilar from each other (pneumatic, hydraulic, electric actuators) could be adopted for driving the movements of the movable parts of the half-moulds.

The necessary characteristics of complementarity being preserved, the conformations of the two half-moulds could still be adapted in a specific manner to the characteristics of the articles which are to be formed. For example, in addition to shaped tubular ducts, the invention enables elements such as bumpers and hollow mouldings for motor vehicles to be formed from semi-finished tubes of thermo-softening plastics material, possibly with a moulding process which does not require the blowing action.

To advantage, the apparatus according to the invention may also be coupled to apparatus for the manufacture of containers, such as motor vehicle tanks, so as to enable the container or tank and its filling tube to be made in a single moulding operation.

I claim:

1. An apparatus for forming a curve in a semi-finished tube of softened plastic material comprising: two complementary half-moulds operable to mate together to define a tubular mould cavity, at least one of said half-moulds having two mould sections defining a portion of said mould cavity, one of said mould sections being angularly rotatable relative to the other about a predetermined axis between a first position wherein said mould cavity is substantially straight and a second position wherein said mould cavity has a shape reproducing the curve to be formed in said tube of softened plastic material, and means for moving said one mould section from said first position to said second position.

2. Apparatus according to claim 1, wherein said mould cavity has two opposing ends through which the opposite ends of said semi-finished tube extend in use, and wherein at least one of the ends of said mould cavity has an associated pusher member which is movable inwardly of said mould cavity itself in response to the movement of said one of said mould sections towards said second position, said pusher member operable to thrust the corresponding end of said semi-finished tube into the mould cavity.

3. Apparatus according to claim 2, wherein each pusher member has associated cam means for causing said pusher member to move into said mould cavity as a result of the movement of said one of said mould sections towards said second position.

4. Apparatus according to claim 1, for forming an article having at least two curves extending around two non-parallel axes, wherein a movable mould section is provided for each curve and can effect an oscillating movement between a first position of introduction of the semi-finished tube and a second position about an axis parallel to the axis around which the respective curve extends.

5. Apparatus according to claim 1, wherein movement of said one of said mould sections between said first position and said second position, causes the formation of a break in the continuity of said mould cavity, and therein an auxiliary mould section is provided and is movable towards the mould cavity in order to eliminate the break in continuity.

6. Apparatus according to claim 1, further comprising at least one blowing nozzle for introducing pressurized gas into the mould cavity.

7. An apparatus according to claim 1 wherein each of said half-moulds includes an auxiliary mould section having an auxiliary cavity portion therein, said auxiliary mould section movable when said one of said mould sections is in said second position between a first position remote from said mould cavity to a second position between a first position with said mould sections wherein said auxiliary cavity portion cooperates with said mould cavity defined by said mould sections and defines a region forming the curve in said tube.

* * * * *